(12) United States Patent
Hishon (10) Patent No.: US 10,875,491 B2
(45) Date of Patent: Dec. 29, 2020

(54) BODY PANEL LIFTER MECHANICAL ENERGY MANAGEMENT SYSTEM

(71) Applicant: Key Safety Systems, Inc., Sterling Heights, MI (US)

(72) Inventor: Michael Hishon, New Baltimore, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 16/235,788

(22) Filed: Dec. 28, 2018

(65) Prior Publication Data

US 2020/0207302 A1 Jul. 2, 2020

(51) Int. Cl.
*B60R 21/38* (2011.01)
*B60R 21/34* (2011.01)
*F15B 15/19* (2006.01)

(52) U.S. Cl.
CPC .............. *B60R 21/38* (2013.01); *B60R 21/34* (2013.01); *F15B 15/19* (2013.01)

(58) Field of Classification Search
CPC ......... B60R 21/01; B60R 21/34; B60R 21/38; B62D 25/12; F15B 15/19
USPC .................................................... 296/187.04
See application file for complete search history.

(56) References Cited

U.S. PATENT DOCUMENTS

| | | | |
|---|---|---|---|
| 3,538,785 A | 11/1970 | Grancon | |
| 3,788,148 A | 1/1974 | Connell et al. | |
| 6,039,353 A | 3/2000 | Bauer et al. | |
| 6,076,856 A | 6/2000 | Wang et al. | |
| 6,302,458 B1 | 10/2001 | Wang et al. | |
| 6,942,056 B2 | 9/2005 | Nadeau et al. | |
| 7,559,398 B2* | 7/2009 | Karlsson | B60R 21/38 180/274 |
| 8,657,056 B2* | 2/2014 | Laspesa | F15B 15/1476 180/274 |
| 2005/0000766 A1* | 1/2005 | Borg | B60R 21/2644 188/276 |
| 2011/0011256 A1* | 1/2011 | Borg | B60R 21/38 91/356 |
| 2016/0001736 A1* | 1/2016 | Van Hooser | F15B 15/19 89/1.14 |
| 2018/0058481 A1* | 3/2018 | Wilmot | F15B 21/044 |

FOREIGN PATENT DOCUMENTS

DE 102004004987 12/2004
DE 102010027931 5/2012

* cited by examiner

*Primary Examiner* — Jason S Daniels
(74) *Attorney, Agent, or Firm* — Meunier Carlin & Curfman LLC (57) ABSTRACT

A pyrotechnic activated body panel lift actuator assembly for a vehicle having a unique deployment profile and energy absorbing feature is disclosed. The assembly has a pyrotechnic actuator, a thin-walled tube and a piston. The tapered portion of the piston forms a recess between the piston and the tube. One or more balls sized to fit in the recess are provided. Upon activation, the piston is thrust proximally outwardly to lift a portion of a body panel to absorb an impact of a person hit by the vehicle and thereafter the piston retracts under controlled substantially constant force generated by balls moving up the tapered portion of the shaft thereby locally plastically deforming the thin-walled tube.

16 Claims, 14 Drawing Sheets

Graph 1 – Overall phases of Actuator performance.

BODY PANEL LIFTER MECHANICAL ENERGY MANAGEMENT SYSTEM

TECHNICAL FIELD

The present invention relates to a pyrotechnic activated body panel lift actuator, more particularly to an actuator with an improved energy dissipation for protecting a person hit by a vehicle.

BACKGROUND OF THE INVENTION

In an effort to minimize injury to a person hit by a vehicle, various devices have been developed that reduce the chances of the person hitting the roof pillars or windshield or other body panels of the vehicle.

Some of these devices include inflatable pedestrian airbags that deploy when a sensor activates on a signal or indication of a pedestrian or cyclist being hit.

Some involve hood lift devices that raise the bonnet or hood and allow the person hit by the vehicle to impact the elevated hood initially, thereby reducing the energy of the blow while also reducing the chances of the person's head hitting the rigid front pillars or windshield. A variety of hood lifters have been designed and some are spring-loaded, some are fluid activated and others are pyrotechnically activated by activating a small gas generant charge to propel a piston inside a tube assembly. Once deployed, the hood lifts near the windshield to protect the pedestrian. After being deployed, the hood lifting device preferably can collapse or lower by the use of venting the gases inside the tube.

Such hood lifter designs presently do not have a means to provide a controlled force during downward displacement after initial deployment. The lack of this controlled force can limit the performance of the hood lifter in providing pedestrian protection during head and body impact to the vehicle.

Definitions

As used herein, body panel refers to any panel, section or portion of a vehicle that can be extended to minimize impact to a pedestrian in the event of an impact. For example, a vehicle fender, hood, roof, trunk, door, bumper, or grill area.

SUMMARY OF THE INVENTION

A pyrotechnic activated body panel lift actuator assembly for a vehicle having a unique deployment profile and energy absorbing feature is disclosed. The assembly has a pyrotechnic actuator, a thin-walled tube and a piston. The pyrotechnic actuator is responsive to a sensor signal indicating an impact with a pedestrian or person outside. The thin-walled tube has an internal chamber. The piston is stowed internally in the chamber of the thin-walled tube. The piston has a shaft with a proximal end for connecting to a portion of a body panel bracket configured to be affixed to said body panel and a distal end having an annular base with an external diameter sized to fit inside the chamber and a frustoconical or tapered ramp portion having a narrow or minimum diameter Di increasing in diameter extending from adjacent the base toward the proximal direction. The tapered ramp portion forms a recess between the piston and the tube. One or more balls sized to fit in the recess are provided. Upon activation, the piston is thrust proximally outwardly to lift a portion of a body panel to absorb an impact of a person hit by the vehicle and thereafter the piston retracts under controlled substantially constant force generated by balls moving up the tapered ramp portion of the shaft thereby locally plastically deforming the thin-walled tube.

The thin-walled tube preferably has a stop at the proximal end to retain the piston and balls to prevent the parts from leaving the tube on activation. The tube is preferably made of a thin-walled metal, such as steel or aluminium. The one or more balls are preferably made of hardened steel.

BRIEF DESCRIPTION OF THE DRAWINGS

The invention will be described by way of example and with reference to the accompanying drawings in which.

DETAILED DESCRIPTION OF THE INVENTION

With reference to FIGS. 6-12, various embodiments of the present invention are illustrated along with a prior art piston.

Figure 6:
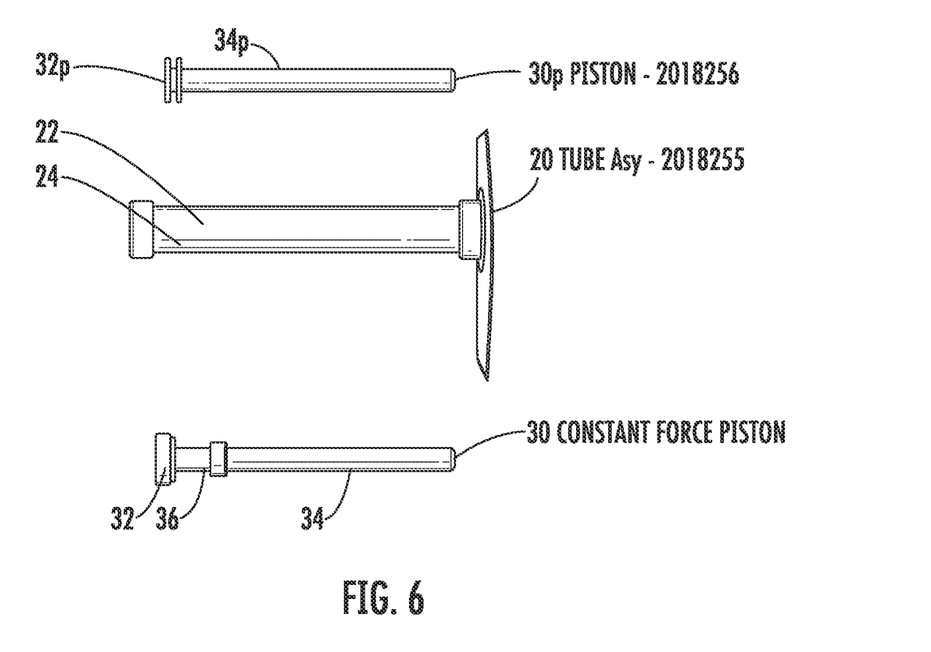
FIG. 6 is a top view of a prior art piston, a tube assembly and a piston made according to the present invention.

As illustrated in FIG. 6, the thin-walled tube assembly 20 with a thin-walled tube 22 extending having a chamber 24 for receiving a piston 30p or 30. Historically, this assembly would be made by inserting the prior art piston 30p shown above the tube assembly 20. This piston 30p would have an elongated shaft 34p and a base end 32p with two flanges that would allow the piston 30p to be fitted into the chamber 24 snugly such that when the pyrotechnic device 50 would be charged, it would force the piston 30p in a thrusting upward direction until it hit a stop 60 at its full extension. When this occurred, the piston 30p and tube assembly 20p could be vented to relieve the pyrotechnic gases that generated in the initial activation force to propel the piston 30p. Upon venting, the assembly 20 will then allow the lifted body panel to retract in the downward direction. This occurs in a rather uncontrolled manner and the forces on retraction are non-linear and create a rather random release of pressure as the lifter is being compressed from the deployed condition.

As further shown in FIG. 6, below the tube assembly 20 is a piston 30 made in accordance with the present invention. This piston 30, unlike the prior art piston 30p, has a similar elongated shaft 34, but at the base or distal end 32 has fundamentally the same base end 32, but adjacent to it further has a tapered conical or ramped portion 36 extending. This conical or ramped portion 36 provides a capability of the piston 30 upon retraction and being downwardly driven back after deployment. This ramped portion 36 provides the opportunity for the body panel lifter 10 to retract under a substantially constant force and can be tuned to various force levels as desired for any specific application.

Figure 7:
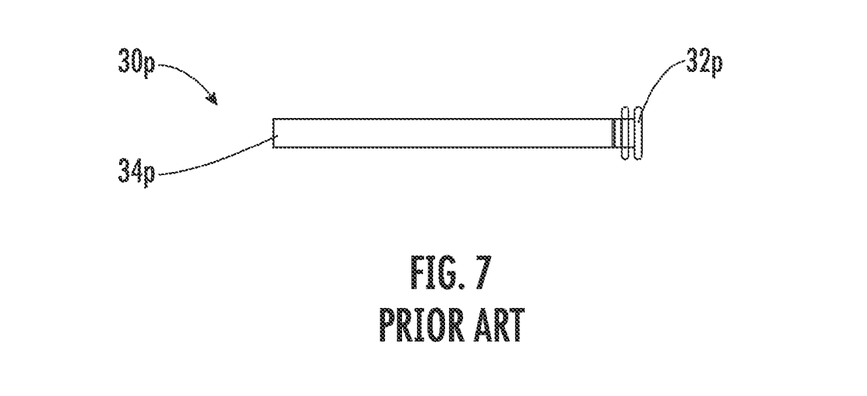
FIG. 7 is a side view of the prior art piston taken from FIG. 6.

As shown in FIG. 7, the prior art piston 30p is illustrated. It is symmetrical having the distal end base 32p and the elongated shaft 34p extending proximally to the end. The proximal end of the shaft 34p can then be attached to a bracket or assembly on a portion of the body panel (not illustrated).

Figure 8:
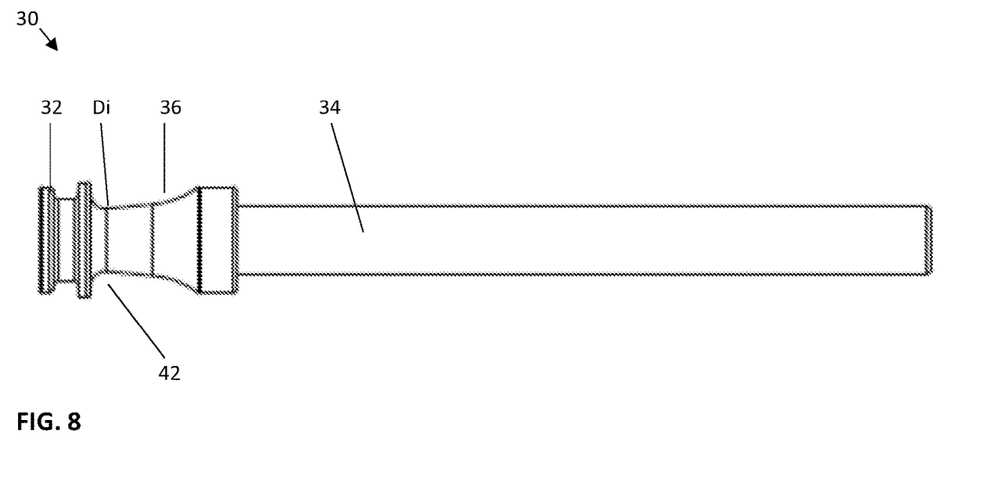
FIG. 8 is a side view of the distal portion of the piston of the present invention showing the base and conical or tapered ramp portion.

With reference to FIG. 8 of the present invention, the distal base end 32 of the piston 30 is shown enlarged, wherein the base 32 is shown similar to the prior art, however adjacent the base 32 is a ramped or tapered conical portion 36 extending from the base 32 towards the proximal direction and thereafter the shaft 34 continues to extend toward the proximal end. This tapered ramp portion 36 creates a large space or recess 42 between the tube 22 on assembly and the shaft 34 of sufficient size that a ball, sphere or other locking device 40 can be inserted in the recess 42 formed between the tube chamber 24 and tapered ramp portion 36.

Figure 9:
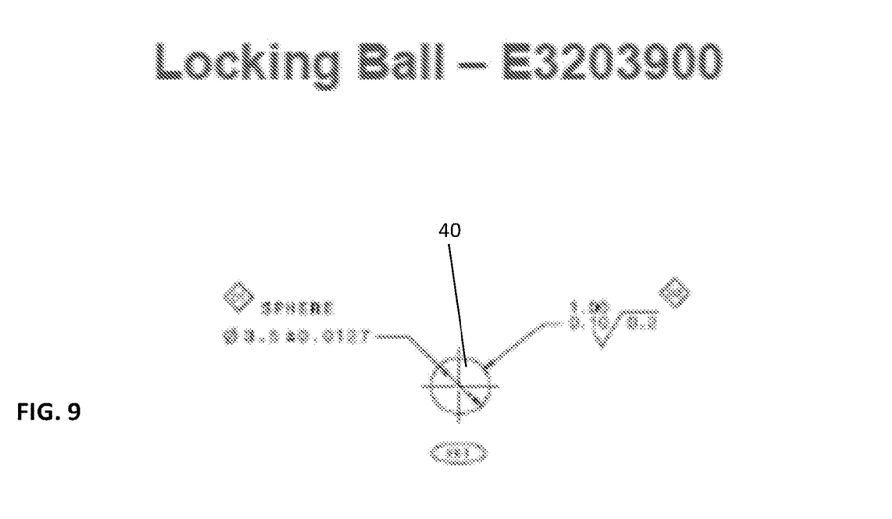
FIG. 9 is a side view of a representative ball used in the actuator assembly of the present invention.

The ball 40 is shown in FIG. 9 as a spherical component. One or more such balls 40 could be used, preferably one or more balls 40 would be used. The balls 40 could be sized so that they create a plastic deformation in the thin-walled tube 22. The balls 40 alternatively can be small round cylinders or other rolling shapes.

Figure 10:
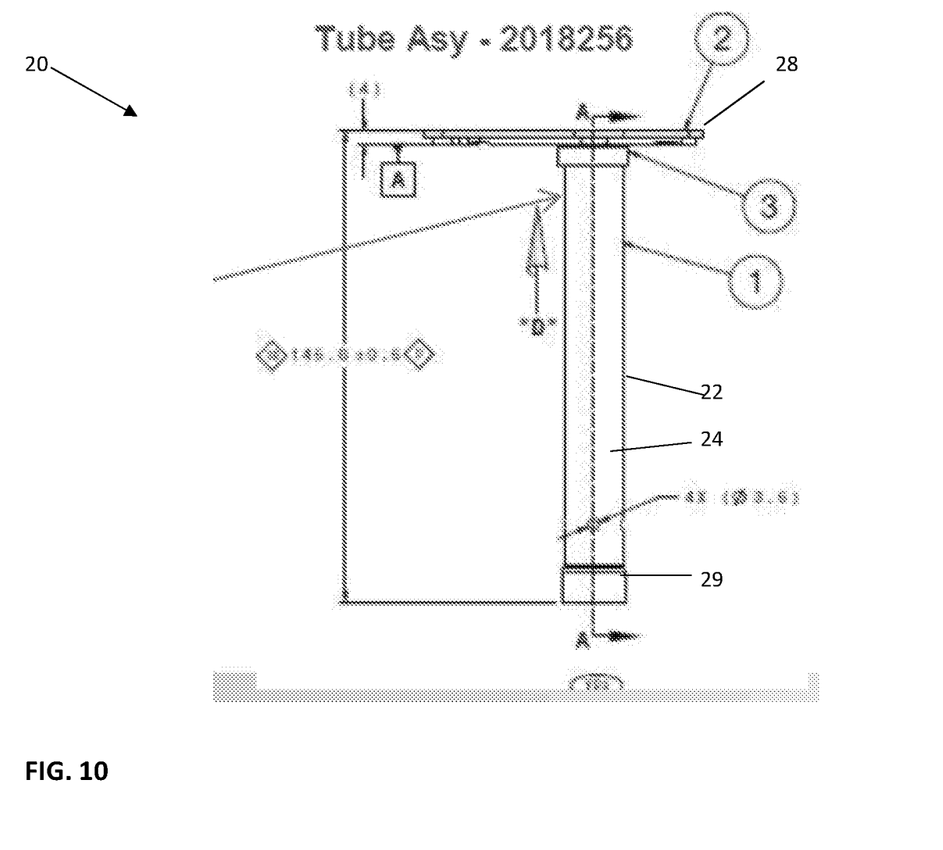
FIG. 10 is a side view of the tube assembly.

FIG. 10 illustrates the thin-walled tube 20 mounting bracket assembly 28 indicated at the proximal end and a crimped end 29 at the distal end.

Figure 11:
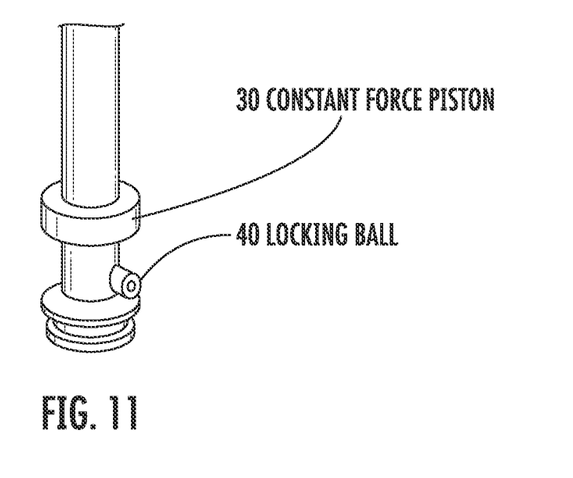
FIG. 11 is a partial perspective view of the piston distal end portion with a ball shown resting on the upper surface of the base end in the recess formed by the tapered ramp portion.

The piston 30 shown in FIG. 11 with a locking ball 40 can be assembled in the tube assembly 20 and upon assembly or partial assembly, the ball 40 is inserted at the base of the piston 30 in the narrowest portion of the tapered ramp portion 36 and that assembly is inserted into the tube chamber 24 to complete the assembly 20 as the device is then slid into the full pre-deployment position.

Figure 12:
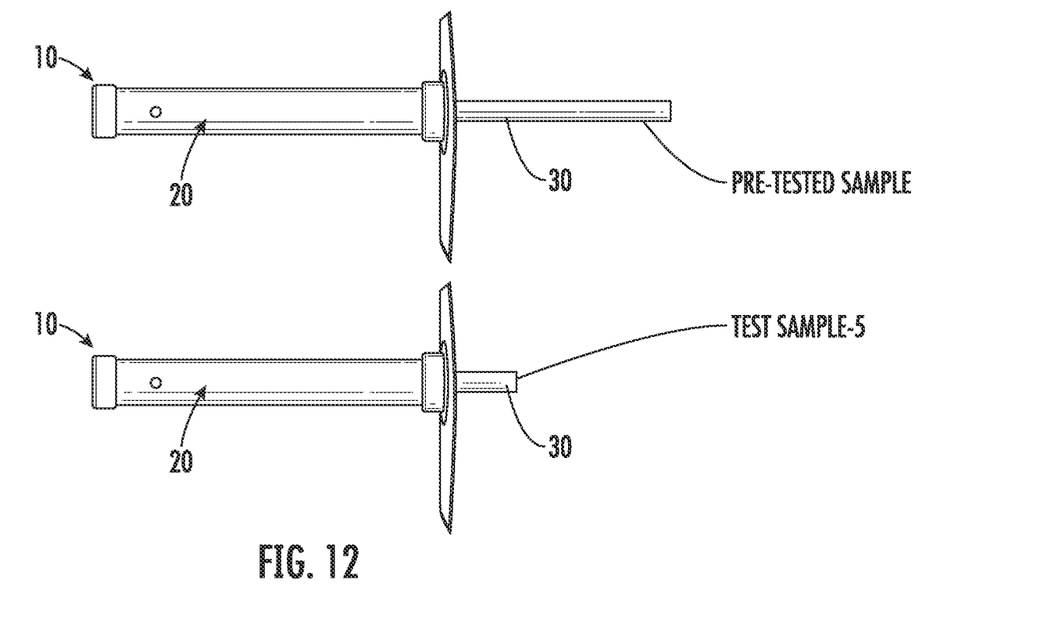
FIG. 12 is a view of two exemplary tube assembly with the piston extended in a first pre-test mode and the second shown in a post-test mode.
Figure 13:
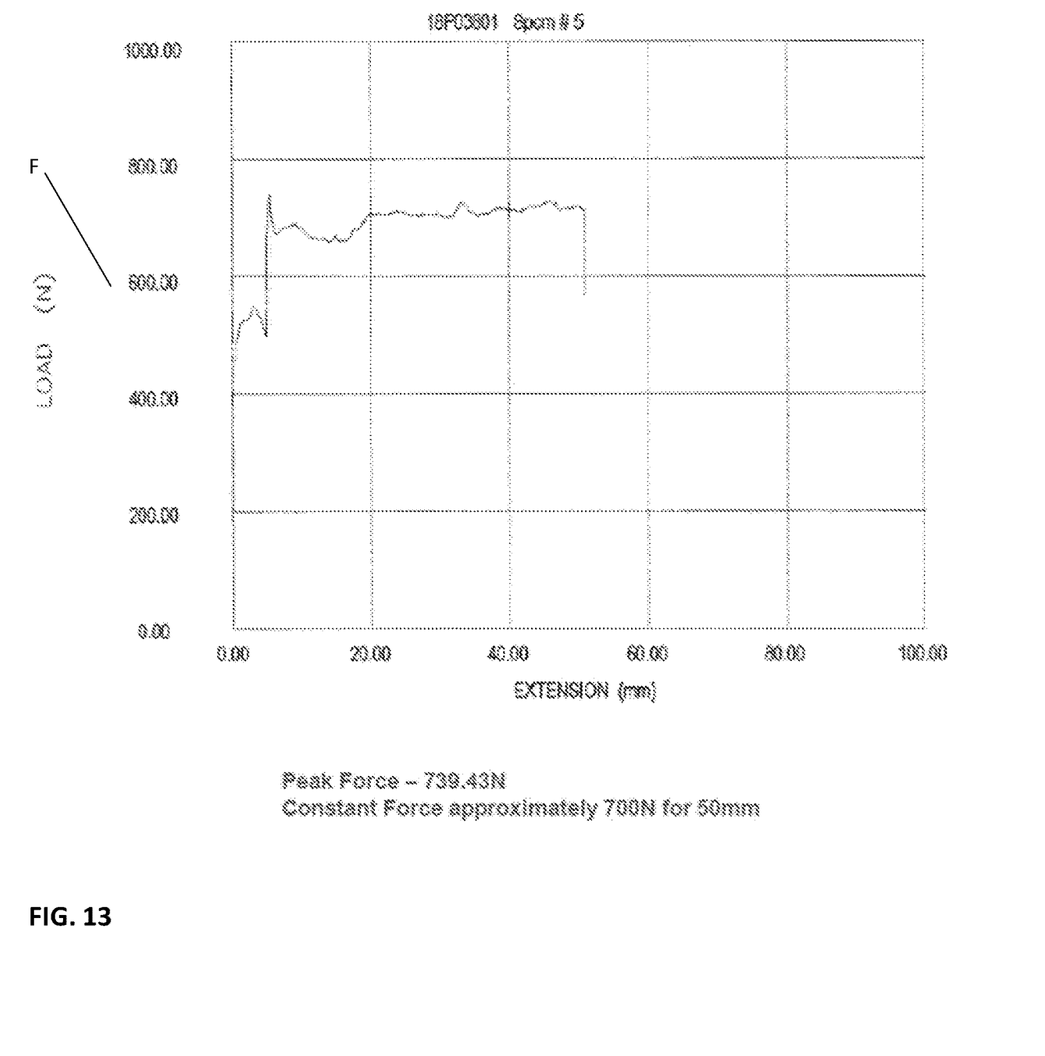
FIG. 13 is a chart showing a load profile in newtons over an extension of the piston measured in mm.

With reference to FIGS. 12 and 13, the pyrotechnic body panel lift assembly of the present invention is illustrated. A pre-test sample is shown in the upper portion of FIG. 12 and a test sample is shown in the lower portion of FIG. 12. Under this test condition, a peak load pressure of 739.43 N was applied with a constant force approximating 700 N for a displacement of 50 mm on a movement of the body panel lifter 10 back into the chamber 24 as it was downwardly being thrust. This load is achieved by the ball 40 moving up the tapered ramp portion 36 of the piston 30. What is important to note, is that this ability to achieve a constant force over a distance provides a unique feature that can be tuned to assist in protecting a pedestrian that has been impacted by a vehicle. As the body panel is lifted, and the person impacts the body panel, the ability of the body panel lift assembly 10 to absorb the energy of the impact can provide a resistance of 700 N over 50 mm provides a safety feature that heretofore was not contemplated. This energy absorbing capability of the body panel lifter in combination with deformation of the body panel itself provides additional safety for an occupant and helps absorb the impact energy to reduce the pedestrian's injuries when struck by a vehicle.

Figure 1:
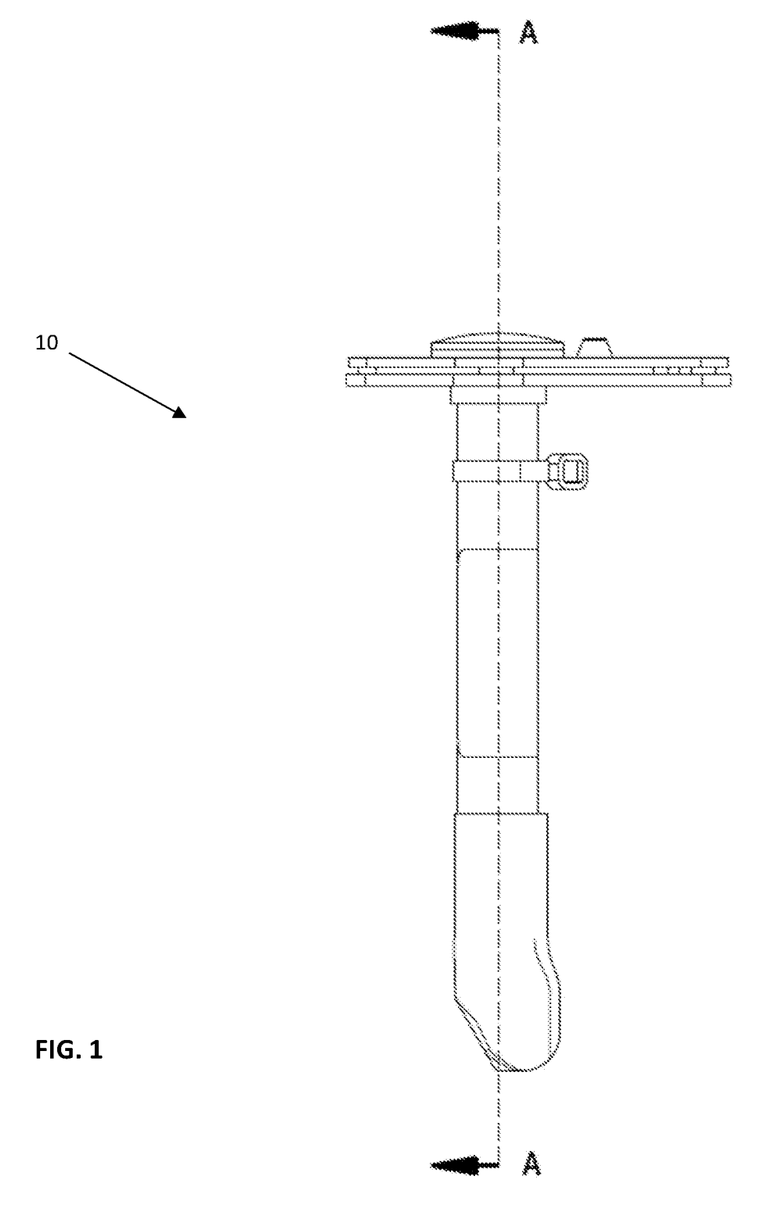
FIG. 1 is a side view of the pyrotechnic activated body panel lift actuator assembly of the present invention in a non-deployed position.
Figure 1A:
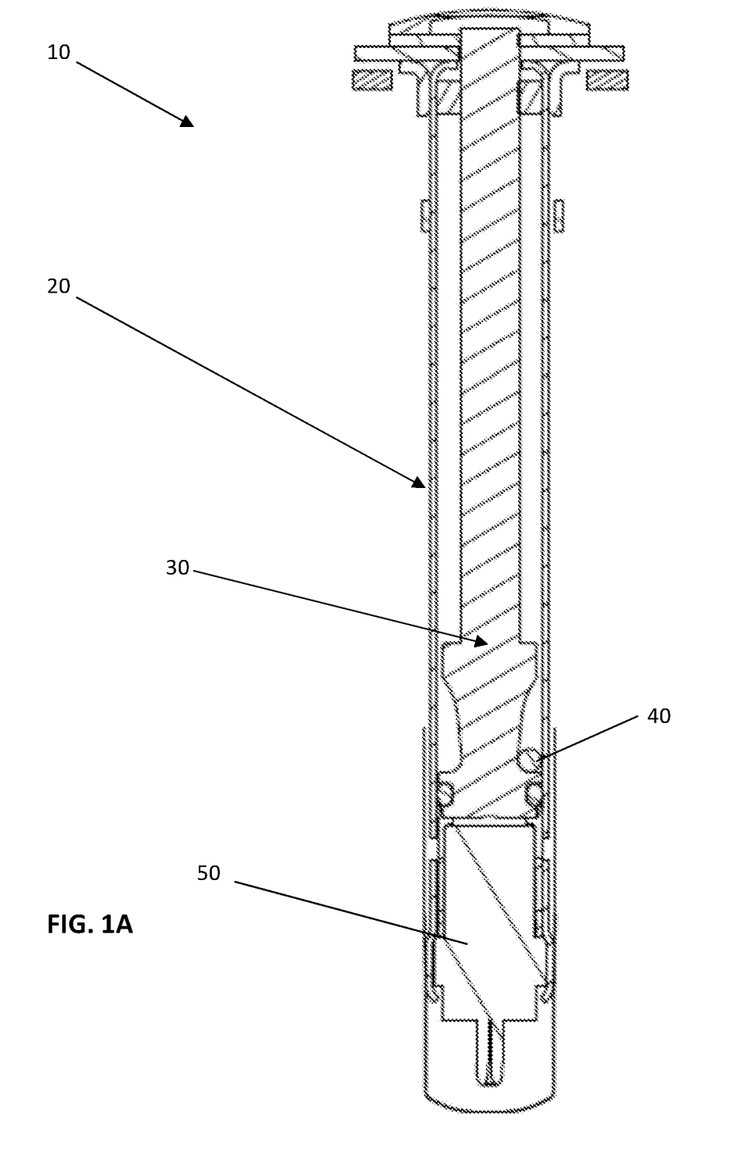
FIG. 1A is a cross-sectional view taken from FIG. 1 along lines A-A showing the piston in a non-deployed position.
Figure 1B:
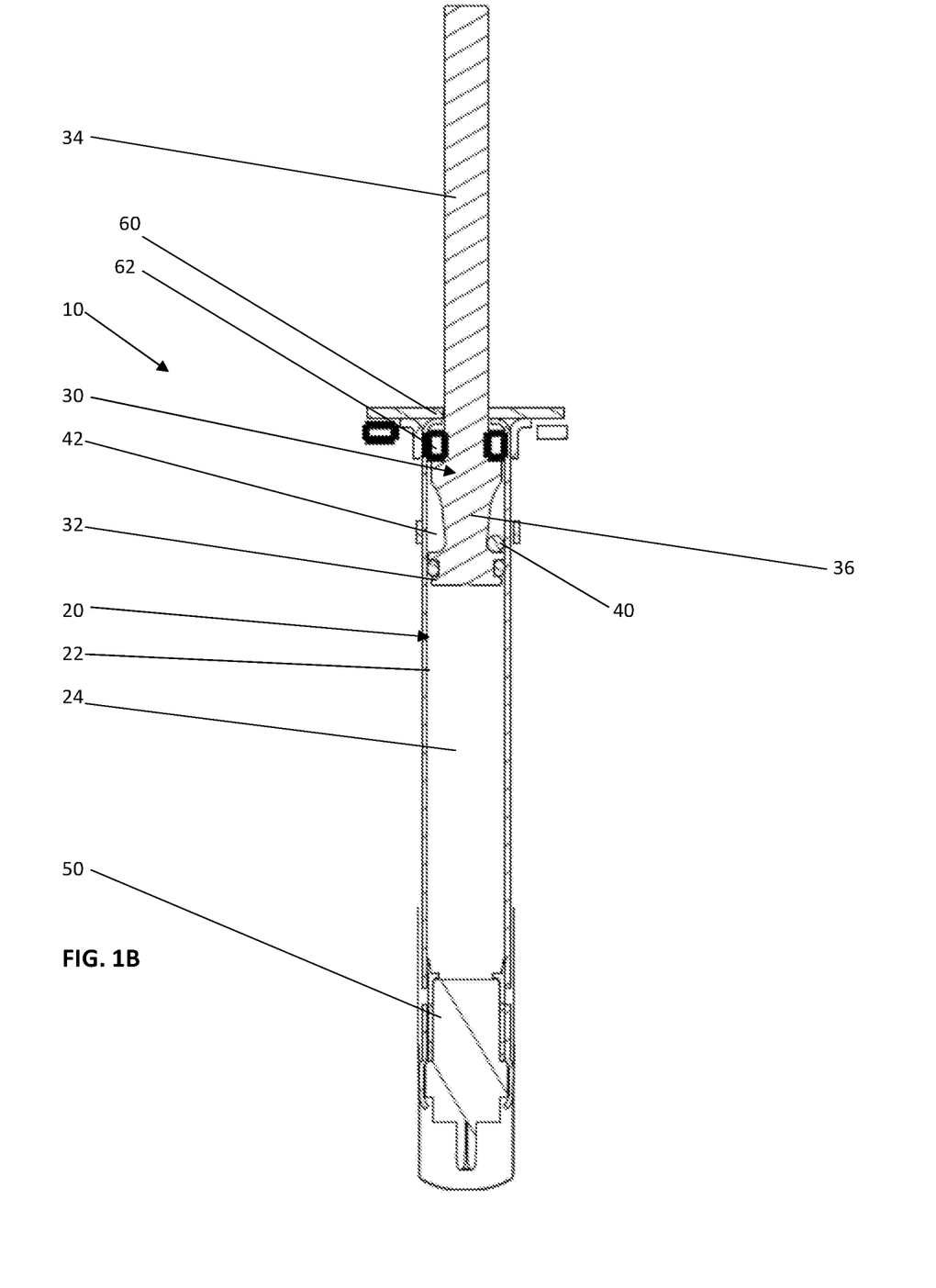
FIG. 1B is a cross-sectional view showing the piston fully extended after deployment, the balls remain in their assembled position
Figure 2:
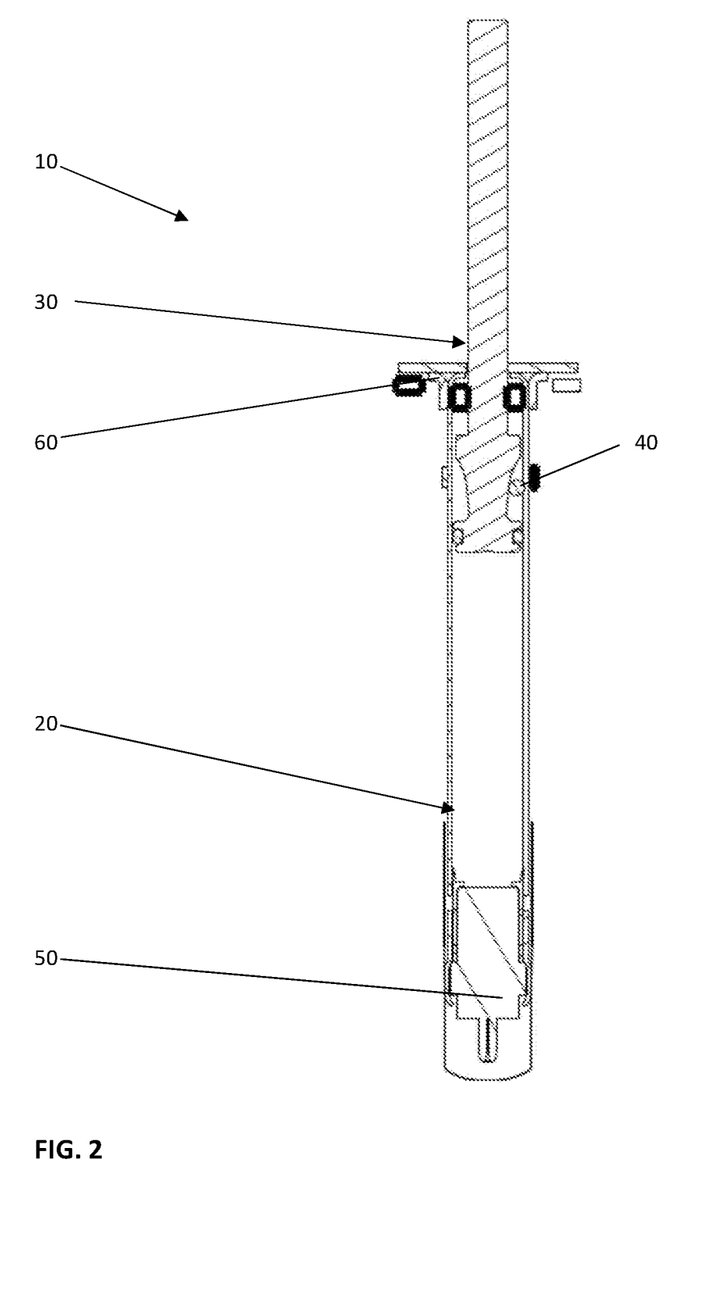
FIG. 2 is a second view after deployment at initial downward displacement of the piston showing the balls beginning to ride up the tapered ramp portion of the piston.
Figure 3:
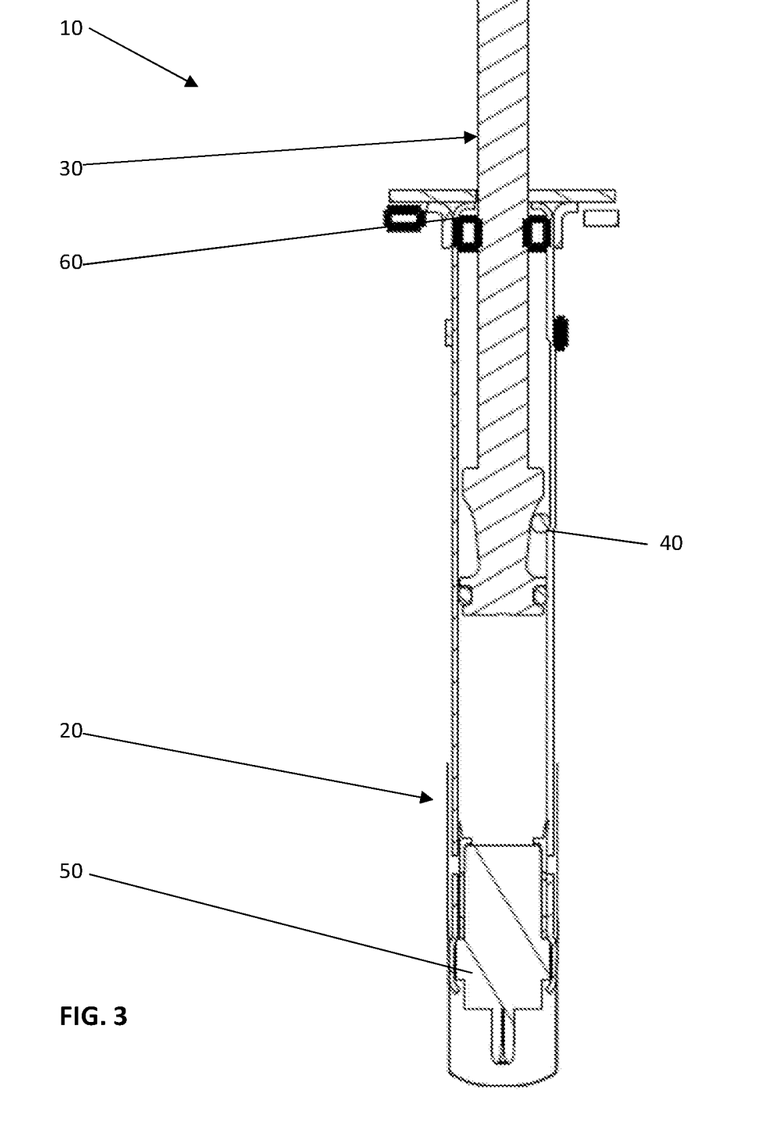
FIG. 3 is a third view of the piston further in the downward displacement where the balls have fully ridden up the ramp portion of the piston pressing against the inside of the tube causing plastic deformation of the tube along the balls' path as the piston displaces downward.
Figure 4:
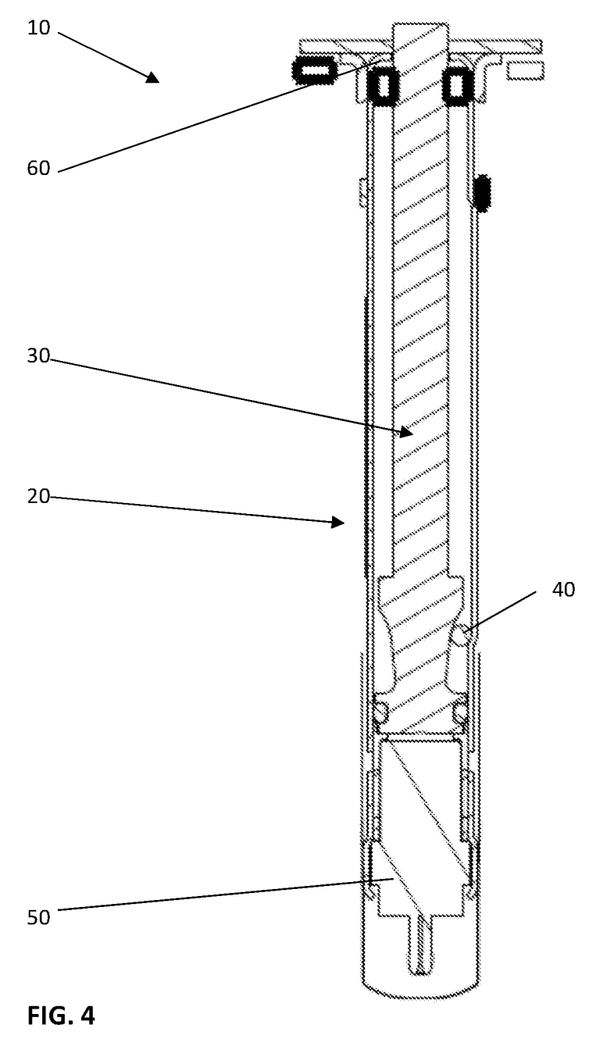
FIG. 4 is a fourth and final view after deployment showing the piston fully displaced downwardly in the tube showing the full plastic deformation of the tube as the balls moved downwardly with the piston.

To better appreciate how the present invention functions, cross-sectional views of the body panel lifter assembly 10 at various stages of deployment are illustrated in FIGS. 1A-4. With reference to FIG. 1, a side view of the lifter assembly 10 is shown in a non-deployed position. FIG. 1A is a cross sectional view of the hood lifter assembly 10 taken from FIG. 1 showing the tube assembly 20, piston 30, one or more balls 40 and pyrotechnic device 50. As shown in FIG. 1B, a fully extended piston 30 is shown where the piston 30 with a stop washer 62 is pushed up against a stop 60 in the chamber 24 of the thin-walled tube 22. At the distal end the pyrotechnic device 50 is shown. This pyrotechnic device 50, when activated, will send a charge of gas driving the piston 30 into this deployed forward position as shown in FIG. 1B. In this fully extended position, the hood is now elevated. Accordingly, the micro-gas generator or igniter 50 ignites due to a predetermined electrical signal and when ignited generates hot expanding gas which pushes against the base end 32 of the piston 30 and moves it to its full extension. During deployment, the balls 40 remain in their initial assembled position, the balls 40 do not move from an upper surface of the base end 32, but are actually thrust upwardly along with the piston 30. After the body panel lifter 10 has achieved its maximum extension, the body panel lifter 10 can start its energy management function which is achieved after the pedestrian head or body impacts the body panel. the body panel lifter piston 30 begins to displace downwardly from its fully extended position as shown in FIG. 2. At the initial downward displacement of the piston 30, the balls 40 begin to ride up the tapered ramp portion 36 of the piston 30 moving away from the base end 32 and up the ramp portion 36. As further shown in FIG. 3, once the balls 40 have been fully ridden up the ramp portion 36 of the piston 30, they press firmly against the inside wall surface of the thin-walled tube 22 and plastically deform the tube 22 along the path of the balls 40 as the piston 30 is displace downwardly. This is best shown in FIG. 3 when the piston 30 is in this downward displacement direction. Once fully compressed in the downward position, the piston 30 will be as shown in FIG. 4 compressed back inside the chamber 24. During this compression back, the mechanical properties of the tube 22 when plastically deformed by the balls 40 provides a relatively constant resistant force (F) which has been designed to provide energy management for the pedestrian head/body impact protection and body panel reset forces.

The amount of force generated by the balls against the tube can be tuned based on the number of balls 40 used, the tube material selected and the thickness of the wall of the tube 22; and the amount of interference of the balls 40 to the tube by the ramp portion 36 height; and the time to begin energy management by the ramp slope.

In the preferred embodiment, it is believed the thin-walled tube 22 should be made of a soft metal alloy, steel or aluminium or similar material that can be plastically deformed when the balls 40 move downwardly in the locked position. As the balls 40 are moved in this locked, it is preferable that the balls 40 be made of a hardened material, harder than the thin-walled tube 22 such as hardened steel. These hardened balls 40 would then create pathways along the tube 22 which will provide the constant force (F) for the energy absorbing management system of this body panel lifter.

Figure 5:
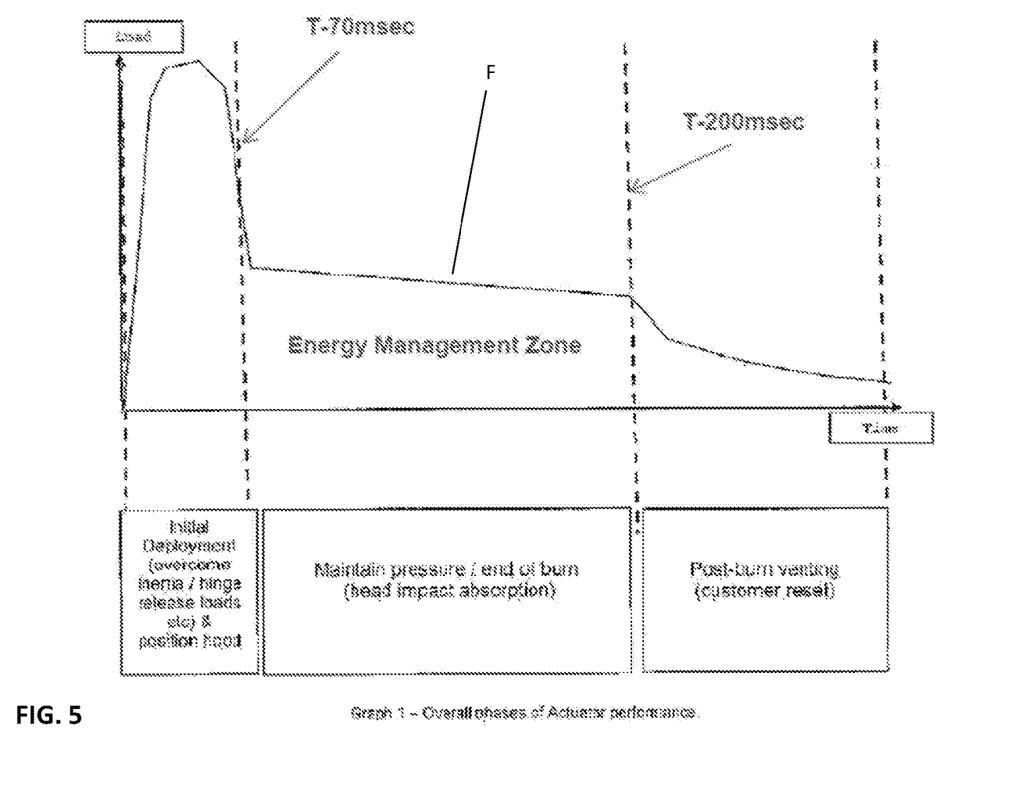
FIG. 5 is a schematic diagram showing the mechanical properties of the tube when plastically deformed by the balls by the downward displacement of the piston provides a constant resistance force designed to provide energy management for pedestrian head/body impact protection, reset force.

With reference to FIG. 5, a schematic chart is shown where the body panel lifter on activation goes to a fully extended position within 70 milliseconds. At this point, a peak force is achieved above the energy management zone illustrated as the lower profile. Once the energy management zone is achieved, when the piston 30 starts its downward displacement. This energy management zone can range for a period of time of approximately 200 milliseconds. At which time, the loads will fall off thereafter called "post burn venting" wherein the customer can reset the body panel lifter device 10 if so desired. The main function of the present invention is to provide the timing between 70 milliseconds and the 200 millisecond location such that a maintenance of force on retraction of the piston can be achieved. This maintenance of pressure for displacing the piston 30 occurs at the end of the burn within the chamber 24 of the gas generator or igniter 50. All this occurs rather quickly on a typical energy management displacement energy zone of the present invention. The design is such that an average force in Newtons for retraction can be shown at a mid-point of the chart and the deviations from this mid-point from the beginning high end to the low end should be approximately 10 percent or less, preferably within 5 percent. When this occurs, this is considered a constant force within the scope of the present invention. The body panel lifter device of the present invention can be designed with a constant force (F) higher or lower than the chart showing 700 N. A range of design load of 500 N up to 1000 N is contemplated. The duration of 200 msec can be increased or decreased from 150 msec to 300 msec based on the tapered ramp portion geometry and dimensions selected. The ability to tune the device 10 performance provides a wide range of design choices all of which exhibit a constant force. No other device has been designed to tune this retraction force with a constant force as described above and therefore is a great improvement over convention body panel lifter assemblies.

As shown, the thin-walled tube 22 when made of steel has a wall thickness of less than 0.060 of an inch, preferably less than 0.030 of an inch.

Figure 14:
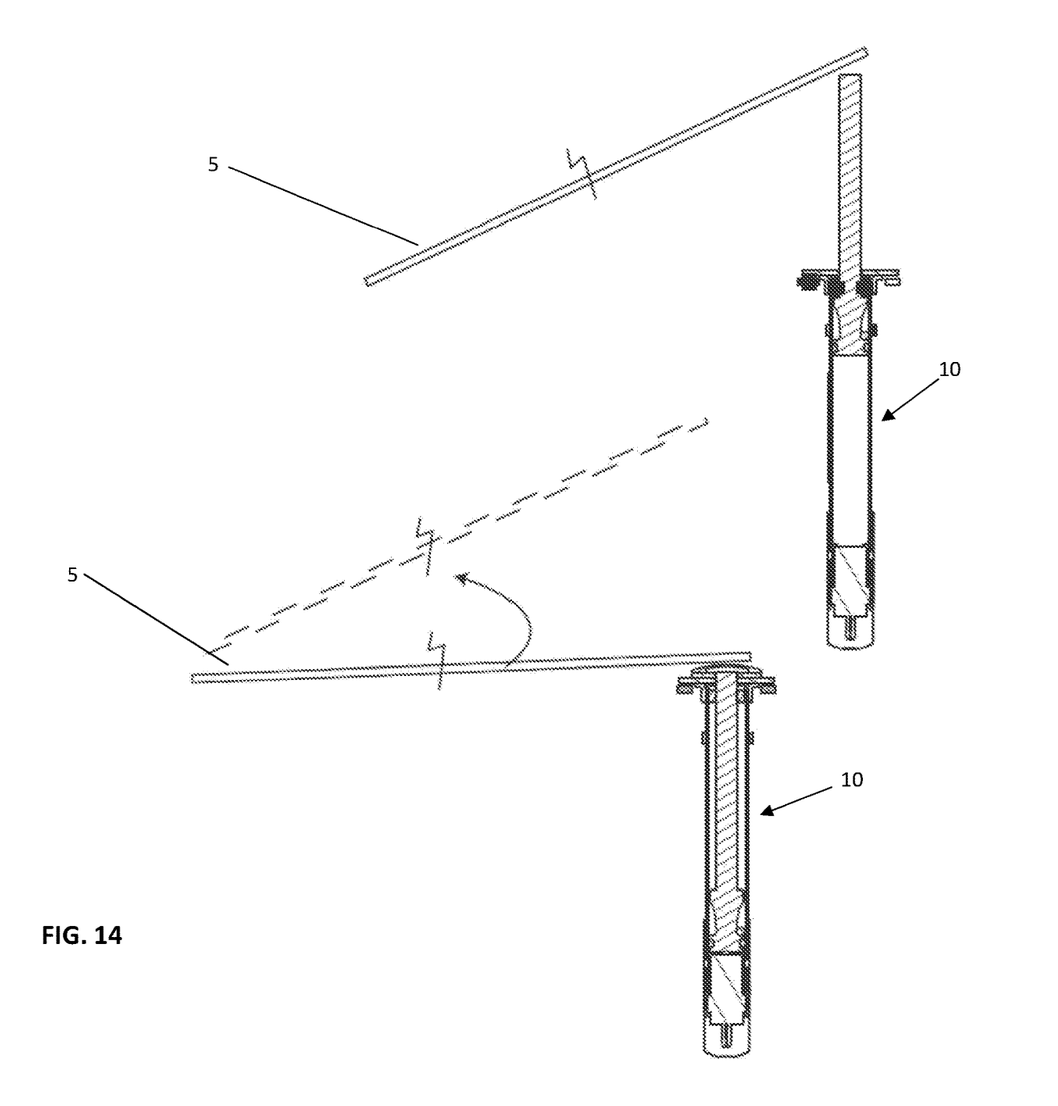
FIG. 14 is a side view of an exemplary body panel lifter showing a rotating body panel or part with one mechanism.
Figure 15:
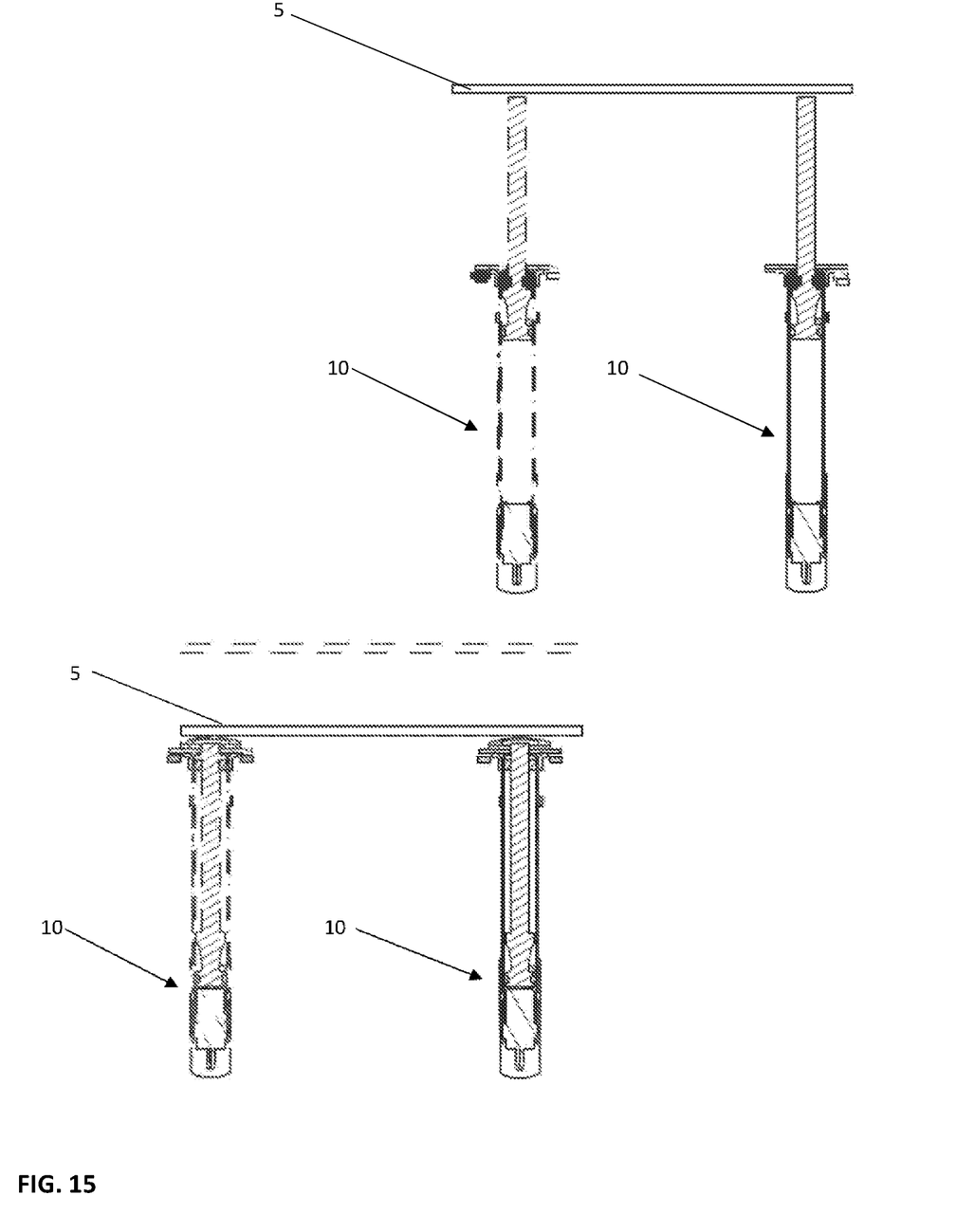
FIG. 15 is a side view of an exemplary body panel lifter showing a translatable body panel or part with 2 piston mechanisms.

With reference to FIGS. 14 and 15, one or more body panel lifting mechanisms 10 are shown lifting an exemplary body 5 panel displacing the body panel 5 from its original position.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A pyrotechnic activated body panel lift actuator assembly for a vehicle, the assembly comprising:
   a pyrotechnic actuator responsive to a sensor signal indicating an impact with a pedestrian or person outside;
   a thin-walled tube having an internal chamber;
   a piston, the piston being stowed internally in the chamber of the thin-walled tube, the piston having a shaft with a proximal end for connecting to a portion of a body panel or bracket affixed to said body panel and a distal end having an annular base with an external diameter sized to fit inside the chamber and a frustoconical or tapered portion having a narrow or minimum diameter (Di) increasing in diameter extending from adjacent the base toward the proximal direction, the tapered portion forming a recess between the piston and the tube;
   one or more balls sized to fit in the recess, and
   upon activation of the pyrotechnic actuator, the piston thrusts proximally outwardly to lift a portion of the body panel to absorb the impact of the person hit by the vehicle, and thereafter the piston retracts under a controlled non-zero, substantially constant force (F) generated by the balls moving up the tapered portion of the shaft thereby locally plastically deforming the thin-walled tube.

2. The pyrotechnic activated body panel lift actuator assembly of claim 1 wherein the one or more balls are made of a hardened metal.

3. The pyrotechnic activated body panel lift actuator assembly of claim 2 wherein the balls are made of hardened steel.

4. The pyrotechnic activated body panel lift actuator assembly of claim 1 wherein the thin-walled tube is made of metal.

5. The pyrotechnic activated body panel lift actuator assembly of claim 4 wherein the thin-walled tube is made of steel.

6. The pyrotechnic activated body panel lift actuator assembly of claim 4 wherein the thin-walled tube is made of aluminum.

7. The pyrotechnic activated body panel lift actuator assembly of claim 1 wherein the controlled force is in the range of 500 N to 1000 N.

8. The pyrotechnic activated body panel lift actuator assembly of claim 7 wherein the controlled force is 700 N.

9. The pyrotechnic activated body panel lift actuator assembly of claim 1 wherein the controlled force exhibits an average force (R) ranging within 10 percent of (F) during downward displacement.

10. The pyrotechnic activated body panel lift actuator assembly of claim 1 wherein the controlled substantially constant force has an average force (R) ranging within 5 percent of (F) during downward displacement.

11. The pyrotechnic activated body panel lift actuator assembly of claim 9 wherein the controlled substantially constant force is held over a time of 150 to 300 msec.

12. The pyrotechnic activated body panel lift actuator assembly of claim 11 wherein the time is about 200 msec.

13. The pyrotechnic activated body panel lift actuator assembly of claim 1 wherein the downward displacement under controlled substantially constant force is 50 mm.

14. The pyrotechnic activated body panel lift actuator assembly of claim 1 wherein the thin-walled tube thickness is less than 0.060 inches.

15. The pyrotechnic activated body panel lift actuator assembly of claim 14 wherein the thin-walled tube thickness is less than 0.030 inches.

16. A pyrotechnic activated body panel lift actuator assembly for a vehicle, the assembly comprising:
- a pyrotechnic actuator responsive to a sensor signal indicating an impact with a pedestrian or person outside;
- a thin-walled tube having an internal chamber;
- a piston, the piston being stowed internally in the chamber of the thin-walled tube, the piston having a shaft with a proximal end for connecting to a portion of a body panel or bracket affixed to said body panel and a distal end having an annular base with an external diameter sized to fit inside the chamber;
- one or more balls sized to fit in a recess, and
- upon activation of the pyrotechnic actuator, the piston thrusts proximally outwardly to lift a portion of the body panel to absorb the impact of the person hit by the vehicle and thereafter the piston retracts under a controlled non-zero, substantially constant force (F) generated by the balls moving up the tapered portion of the shaft thereby locally plastically deforming the thin-walled tube.

\* \* \* \* \*